United States Patent [19]
Murakami

[11] 4,182,988
[45] Jan. 8, 1980

[54] PCM CHANNEL MONITORING SYSTEM FOR DETECTING ERRORS USING SINGLE PARITY BIT

[75] Inventor: Masatoshi Murakami, Tokyo, Japan

[73] Assignee: Nippon Electric Co., Ltd., Tokyo, Japan

[21] Appl. No.: 929,601

[22] Filed: Jul. 31, 1978

Related U.S. Application Data

[63] Continuation-in-part of Ser. No. 833,613, Sep. 15, 1977, abandoned.

[30] Foreign Application Priority Data

Sep. 17, 1976 [JP] Japan .................. 51-112132

[51] Int. Cl.² ........................................... H04B 1/00
[52] U.S. Cl. ........................ 325/41; 340/146.1 AG
[58] Field of Search ................. 325/41; 179/15 AE; 340/146.1 AG

[56] References Cited
U.S. PATENT DOCUMENTS

| | | | |
|---|---|---|---|
| 3,585,586 | 6/1971 | Harmon et al. | 325/41 |
| 3,891,959 | 6/1975 | Tsuji et al. | 325/41 |
| 3,940,736 | 2/1976 | Inaba et al. | 325/41 |
| 4,003,020 | 1/1977 | Clarke | 340/146.1 AL |

*Primary Examiner*—Robert L. Griffin
*Assistant Examiner*—Joseph A. Orsino, Jr.
*Attorney, Agent, or Firm*—Sughrue, Rothwell, Mion, Zinn and Macpeak

[57] ABSTRACT

A channel monitoring system for a carrier wave differential phase modulation PCM transmission system is disclosed. Channel monitoring is accomplished with only one parity bit for one monitoring section of a PCM signal by making use of the correlation in the occurrence of errors due to an error in phase in the transmission path. The PCM signal is monitored at alternate code time slots with the parity check system so that a single code error to an adjacent phase in one parity monitoring section can be detected as a single bit error. Therefore, an error in one parity monitoring section can be reliably detected with the one parity bit so long as the error occurs only once in one monitoring section.

4 Claims, 12 Drawing Figures

PCM CHANNEL MONITORING SYSTEM FOR DETECTING ERRORS USING SINGLE PARITY BIT

CROSS-REFERENCE TO RELATED APPLICATION

This application is a continuation-in-part application of my copending application Ser. No. 833,613, filed Sept. 15, 1977 now abandoned.

BACKGROUND OF THE INVENTION

The present invention relates to a system for monitoring PCM transmission channels employing parity bits.

Generally, in order to assure communication at a high operating ratio in signal transmissions, switching is effected between active and standby channels upon the occurrence of a fault in a transmission path. In PCM signal transmissions, a bit error of a received PCM signal is monitored to detect such a fault.

One of the systems for monitoring such a bit error is a parity check system. according to this monitoring system, on the transmitter side, a PCM signal pulse train to be transmitted is divided into appropriate monitoring sections (each being an interval corresponding to k time slots; k being a positive integer equal to or greater than 2—for example, 510), and information obtained by counting the number of marks or spaces of the PCM signal in each section is added to the PCM signal to transmit as a parity bit for each monitoring section. On the receiver side, the number of marks or spaces of the received PCM signal in the corresponding monitoring section is calculated and compared with the information carried by the received parity bit to confirm whether or not a bit error has occurred in that monitoring section of the PCM signal. This monitoring system has the advantages that monitoring of all the PCM signals to be transmitted can be effected with a relatively simple construction, the precision of monitoring is high, and the time required for the detection of a bit error is short. Where a larger number of errors than can be checked by a parity bit or parity bits assigned to one monitoring section have occurred, it becomes impossible to precisely detect the number of bit errors according to this monitoring system. However, if one parity bit is provided, for example, for several hundreds of PCM pulses, then monitoring for a bit error which may arise at a rate lower than one bit to several hundreds of bits can be effected with sufficiently high precision. Accordingly, this system is attractive for channel monitoring.

For details of some examples of this monitoring system, reference is made to the following literature:

(1) M. A. Rich and J. M. Trecker, "The T4M Digital Line Termination," *Proceedings of International Conference On Communications,* Volume III-48, 1975, pages 48-10 to 48-12.

(2) H. I. Maunsell and C. A. von Roesgen, "The M13 and M34 Digital Multiplexes, *Proceedings Of International Conference On Communications, Volume III-*48, 1975, pages 48-5 to 48-9.

(3) K. Nakagawa et al., "W-40G Code Converters," *Review of The Electrical Communication Laboratories,* NTT, Japan, Volume 23, Nos. 7-8, July-August 1975, pages 799-817.

However, if this monitoring system is applied to a carrier wave differential phase modulation transmission system, a signal error in a transmission path will cause a bit error in each of the two signals pertinent to the error signal on the transmission path because of the differential modulation, resulting in offsetting or cancelling bit errors so that with a monitoring system in which one monitoring section is monitored by means of one parity bit, such a single signal error would become undetectable. Accordingly, in the case where channel monitoring in such a transmission system is effected with a parity check system, it has heretofore been believed that the monitoring must be carried out by providing a plurality of parity bits for one monitoring system, and so monitoring a carrier wave differential phase modulation transmission system with a parity check system had the disadvantages that the signal transmission efficiency was lowered, and the number of constituent elements for composing the parity count section and parity bit multiplex and demultiplex sections in the transmitter and the receiver had to be increased.

SUMMARY OF THE INVENTION

It is one object of the present invention to provide a channel monitoring system in which the aforementioned disadvantages in the prior art are eliminated, and in which, even with respect to a transmission system employing differential modulation, the monitoring is implemented using only one parity bit for one monitoring section of a PCM signal.

A description will be given hereunder of the channel monitoring system of the present invention, especially a channel monitoring system for a transmission system employing 4-phase differential phase modulation in which the differential modulation is effected between adjacent time slots.

BRIEF DESCRIPTION OF THE DRAWINGS

In the drawings:

FIGS. 2(a)-2(i) show time charts of the signals at various points in the block diagram shown in FIG. 1;

FIGS. 5(a)-5(k) show time charts of the signals at various points in the transmitter section in FIG. 4(a);

FIGS. 6(a)-6(n) are time charts showing the signals at various points in the receiver section in FIG. 4(b);

DETAILED DESCRIPTION OF THE PREFERRED EMBODIMENTS

Figure 1A:
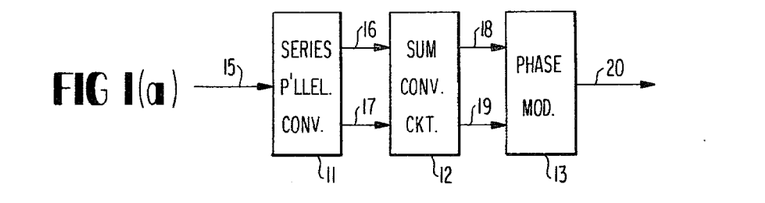
FIGS. 1(a) and 1(b) show block diagrams for explaining the operation of a conventional channel monitoring system, with a transmitter section being shown at (a), and a receiver section at (b)
Figure 1B:
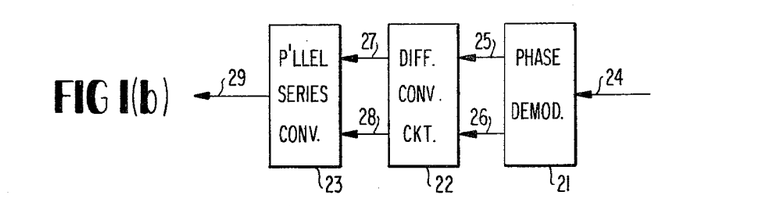
Figure 2:
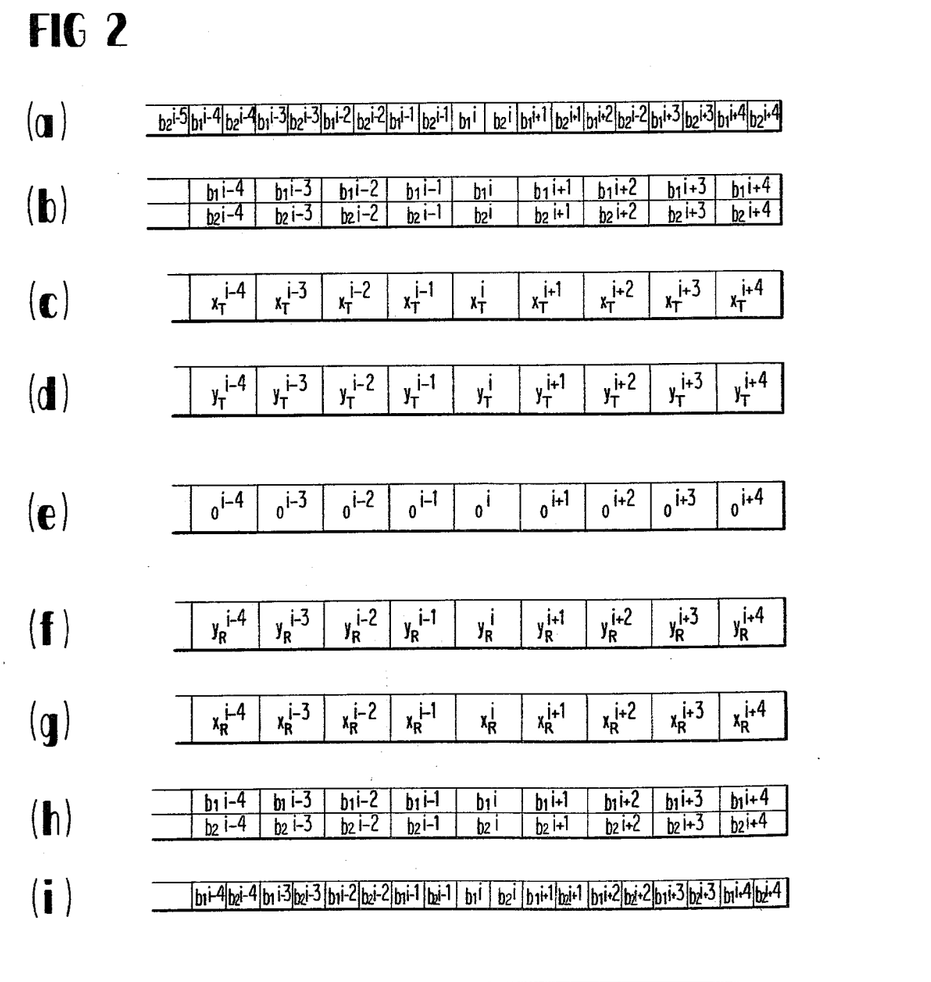

The operation principle of the conventional channel monitoring system as illustrated in FIGS. 1(a) and 1(b)

will now be described with reference to FIGS. 2(a)–2(i). It is to be noted that the superscripts and the symbols in FIGS. 2(a)–2(i) designate the time slots for the respective signals. For example, a symbol $b^i$ designates a signal at a time i, and a symbol $b^{i+1}$ designates a signal at a time i+1.

Referring now to FIG. 1(a), a series of PCM signals on line 15 as shown in FIG. 2(a) are converted by a series-parallel converter circuit 11 into two series of PCM pulse trains on lines 16 and 17 as shown in FIG. 2(b) for the purpose of modulating a carrier wave with a 4-level code. Since each one of these two series of PCM pulse trains on lines 16 and 17 is a bi-level digital signal (or a binary code), these two series of PCM pulse trains can be deemed as a 4-level digital code (or a quaternary code) $X_T$ consisting of two bits of PCM signal as shown in FIG. 2(c) by taking them jointly into consideration for each time slot. In the subsequent description, the PCM pulse having two levels (or binary code) and the signal (deemed as a 4-level digital signal or a quaternary code) consisting of two bits of PCM pulses are distinguished from each other and are termed "a PCM signal" and "a PCM code (or merely a code)," respectively.

The aforementioned code $X_T$ is transmitted according to a carrier wave phase modulation system. However, since it is difficult to reproduce an absolute reference phase from a phase-modulated signal on the receiver side, in the conventional PCM carrier wave phase modulation system it is a common practice to effect differential modulation so that the code $X_T$ may be demodulated on the basis of phase differences of the phase-modulated carrier wave between adjacent time slots. For this purpose, at each time slot of the code $X_T$, a code conversion is effected according to the following formula in a sum conversion circuit ( or an addition logic converter) 12 in FIG. 1(a) to obtain code series $Y_T$ on lines 18 and 19 as shown in FIG. 2(d):

$$Y_T^i = X_T^i + X_T^{i-1}. \quad (1)$$

Figure 3:
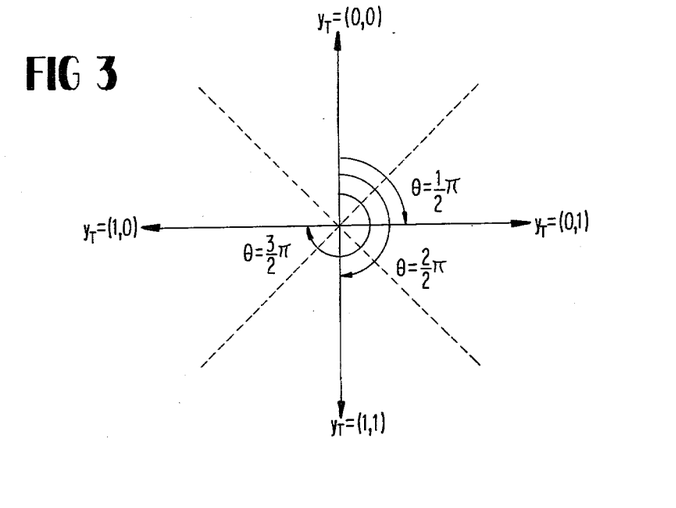
FIG. 3 is a vector diagram showing the codes for effecting 4-phase modulation and the corresponding phases of the carrier wave.

The carrier wave is phase-modulated in a phase modulator 13 by the codes to be transmitted in such manner that the Hamming distance between the codes corresponding to the adjacent phases in the carrier wave modulation phase space may take the minimum value of 1. In the case of the illustrated embodiment employing a 4-level code, phase modulation with the code $Y_T$ is effected for the phase angle $\theta$ between adjacent time slots in the vector space of the carrier wave according to a code represented by the following formula (2) as shown in the carrier wave vector diagram in FIG. 3:

$$\theta^i = \tfrac{1}{2}\pi \times \{Y_T^i\}, \quad (2)$$

where $\{Y_T^i\}$ represents a decimal number corresponding to the 2-bit binary code, i.e. 4-level code (quaternary code) $Y_T^i$ in the following manner:

| $Y_T^i$ |  | $\{Y_T^i\}$ |
|---|---|---|
| 0 0 | → | 0 |
| 0 1 | → | 1 |
| 1 1 | → | 2 |
| 1 0 | → | 3 |

That is, the code $Y_T^i$ is transmitted as a phase-modulated wave on line 20 in which the phase difference of the modulated carrier wave between adjacent code time slots is equal to $\theta^i$ as shown in FIG. 2(e).

On the receiver side, with reference to FIG. 1(b), a demodulated code $Y_R$ on lines 25 and 26 as shown in FIG. 2(f), which corresponds to the code $Y_T$ on the transmitter side as shown in FIG. 2(d), is obtained from a received phase-modulated wave on line 24 by means of a phase demodulator circuit 21. The relation between the demodulated code $Y_R$ and the code $Y_T$ is generally given as:

$$\{Y_R^i\} = \{Y_T^i\} + m \quad (3)$$

when m is a constant value (for example, 0, 1, 2 or 3 in the 4-phase modulation system) determined by the relation between the reproduced reference phase on the receiver side and the reference phase set at the transmitter side. Then a conversion represented by the following formula (4) is effected in a difference conversion circuit (or a subtraction logic converter) 22 which carries out a conversion inverse to that effected on the transmitter side according to the formula (1), and whereby code $X_R$ as shown in FIG. 2(g), which corresponds to the code $X_T$ on the transmitter side shown in FIG. 2(c), can be given as:

$$X_R^i = Y_R^i - Y_R^{i-1}. \quad (4)$$

This code is composed of a binary digital signal of two bits $b_1$ and $b_2$, and it is converted into a series of PCM signals on line 29 as shown in FIG. 2(i) by a parallel-series converter circuit 23 in FIG. 1(b).

Assuming now that all the aforementioned conversions have been effected correctly and the phase angle $\theta$ of the carrier wave on the transmission path has been received without error, then the formula (1), (2), (3) and (4) above are fulfilled so that the following formula (5) is naturally fulfilled, and thus the transmitted PCM signal can be received without error:

$$X_T^i = X_R^i. \quad (5)$$

However, if the modulated phase angle $\theta$ should be erroneously demodulated due to noise in the carrier wave transmission path or the like, then the received PCM signal would not coincide with the transmitted PCM signal, and thus a bit error would arise. For instance, if it is assumed that the modulated phase angle $\theta^i$ at a time slot i has been phase-demodulated erroneously as a code corresponding to an adjacent phase but, at the other time slots, it has been demodulated without error, then an error having a Hamming distance of 1 with respect to the transmitted code $Y_T^i$ will arise in the code $Y_R^i$ demodulated on lines 25 and 26 of the receiver side in FIG. 1(b), as will be seen from the carrier wave vector diagram in FIG. 3. In other words, if the Hamming distances of the code $Y_T^i$ and the code $Y_R^i$ with respect to the origin (0, 0) are represented, respectively, by $d(Y_T^i)$ and $d(Y_R^i)$, then the codes $Y_T^i$ and $Y_R^i$ satisfy the relation represented by the following formula (6):

$$d(Y_R^i) = d(Y_T^i) \pm 1. \quad (6)$$

In addition, the code error represented by the formula (6) results in an error having a Hamming distance of 1 in the code $X_R$ at the time slots i and i+1, respectively, as shown by the following formulae (7) and (8), owing to the difference conversion represented by formula (4):

$$d(X_R^i) = d(Y_R^i) - d(Y_R^{i-1}) \quad (7)$$
$$= d(Y_T^i) \pm 1 - d(Y_T^{i-1})$$
$$= d(X_T^i) \pm 1, \text{ and}$$
$$d(X_R^{i+1}) = d(Y_R^{i+1}) - d(Y_R^i) \quad (8)$$
$$= d(Y_T^{i+1}) - d(Y_T^i) + 1$$
$$= d(X_T^{i+1}) + 1.$$

As shown in FIGS. 2(h) and 2(i), these formulae (7) and (8) indicate that observing the code $X_R$ with respect to its component bits, the code $X_R^i$ and $X_R^{i+1}$, respectively, suffer from an error having a Hamming distance of 1 with respect to the transmitted codes $X_T^i$ and $X_T^{i+1}$. That is, the error in the phase $\theta^i$ in the transmission path causes errors in either one of the bits $b_1^i$ and $b_2^i$ and in either one of the bits $b_1^{i+1}$ and $b_2^{i+1}$.

According to the prior art, two parity bits are needed for such two-bit consecutive errors. However, according to the present invention, it is contemplated to carry out the channel monitoring with only one parity bit by making use of the correlation in the occurrence of errors as analyzed above.

More particularly, among the codes represented by their component bits shown in FIGS. 2(h) or 2(i), if the PCM signals are monitored at alternate code time slots according to the parity check system, then a single code error to an adjacent phase in one parity monitoring section can be detected as a single bit error, and, therefore, the error in one parity monitoring section can be reliably detected with one parity bit so long as it occurs only once in one monitoring section.

The present invention will now be described in more detail referring to FIGS. 4(a) and 4(b). The transmitter section illustrated in FIG. 4(a) is composed of a series-parallel converter circuit 52, a parity counter circuit 100, a multiplexer circuit 53, an addition logic converter 500 and a 4-phase phase modulator circuit 501, and the receiver section illustrated in FIG. 4(b) is composed of a 4-phase phase modulator circuit 500, a subtraction logic converter 601, a parity demultiplexer circuit 71, a counter circuit 200, a parallel-series converter circuit 72 and a code error detector circuit 77.

Figure 4A:
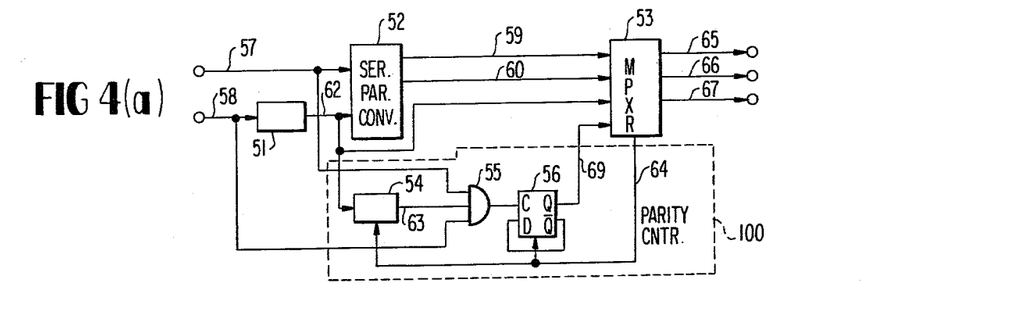
FIGS. 4(a) and 4(b) show a block diagram illustrating one preferred embodiment of the present invention, a transmitter section being shown at (a), and a receiver section being shown at (b)
Figure 4B:
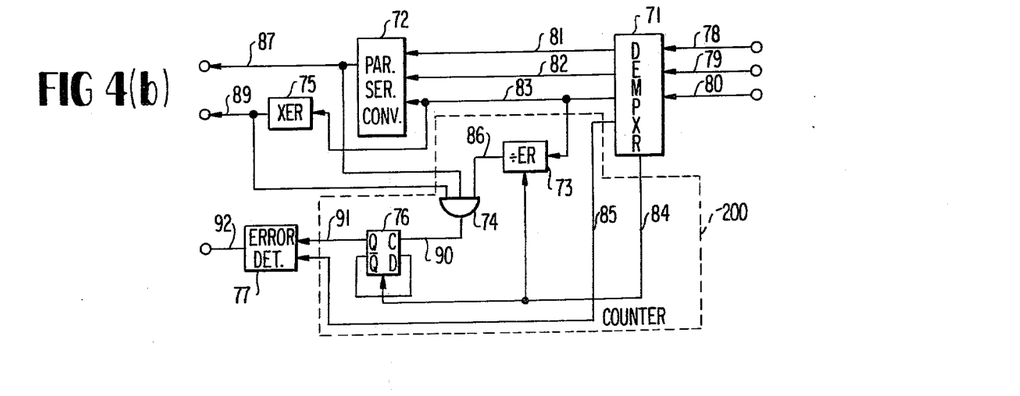
Figure 5:
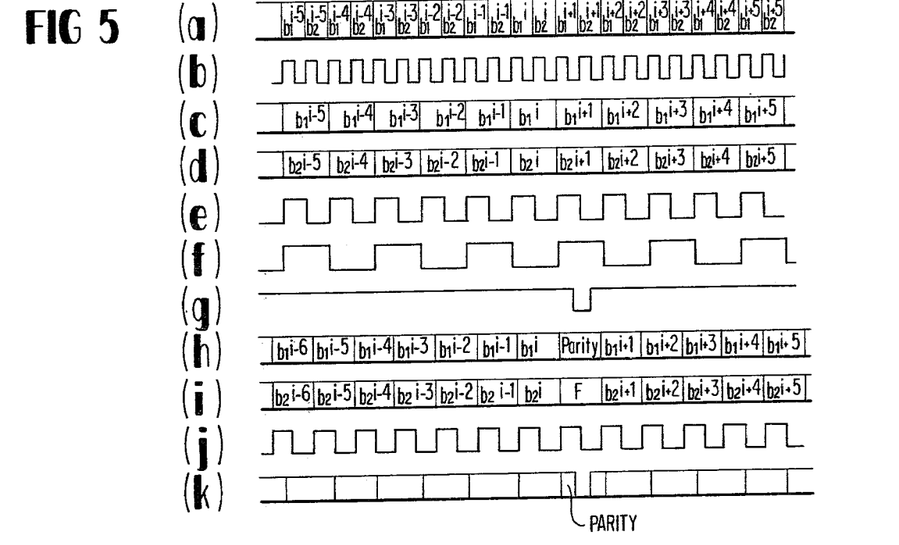

A signal on line 57 in FIG. 4(a) is a series PCM signal as shown in FIG. 5(a). A clock signal on line 58 for this PCM signal as shown in FIG. 5(b) has its frequency divided in half by means of a ½ frequency divider 51. The PCM signal 57 is converted into two series of PCM signals on lines 59 and 60 as shown in FIGS. 5(c) and 5(d) by the series-parallel converter circuit 52 with the frequency-divided clock signal on line 62 as shown in FIG. 5(e). AND gate 55 has as inputs the series PCM signal on line 57, the clock signal on line 58 and another clock signal on line 63 as shown in FIG. 5(f), which is produced by further dividing the frequency of the clock signal on line 62 by a ½ frequency divider 54. AND gate 55 gates the PCM signal on line 57 in alternate code time slots. Marks in the series PCM signal on line 57 are counted for the alternate code time slots by means of a parity-counting, D-type flip-flop 56, and a parity signal on line 69 (P shown in FIG. 5(k)) produced as a result of counting is fed to the parity multiplexer circuit 53.

It is to be noted that among the PCM signals, those in the same parity monitoring section are counted in parity on the transmitter side and also counted in parity on the receiver side, and these parity counts are compared with each other for monitoring purposes. In these monitoring steps, in order to achieve coincidence of the bits to be counted on the transmitter side and on the receiver side, a control for designating from what bit to what bit the counting should be effected at alternate code time slots in each parity monitoring section is necessitated. This control can be carried out, for example, by employing a frame signal on line 64 (shown in FIG. 5(g)) for multiplexing the parity as a control signal for controlling the ½ frequency divider 54 and the parity-counting, D-type flip-flop 56. Then, the two series of PCM signals on lines 59 and 60 are multiplexed with the parity signal on line 69 in the parity multiplexer circuit 53, and the thus produced signals on lines 65 and 66 having their code rate increased by the amount corresponding to the parity multiplex are shown in FIGS. 5(h) and 5(i). This set of signals corresponds to the code $X_T$ shown in FIG. 2(c). These signals on lines 65 and 66 are outputted jointly with a clock signal 67 as shown in FIG. 5(j) to the addition logic converter 500 to effect a code conversion according to the formula (1). The outputs of the converter 500 are fed to the 4-phase phase modulator circuit 501 to provide a modulated carrier wave.

Figure 7:
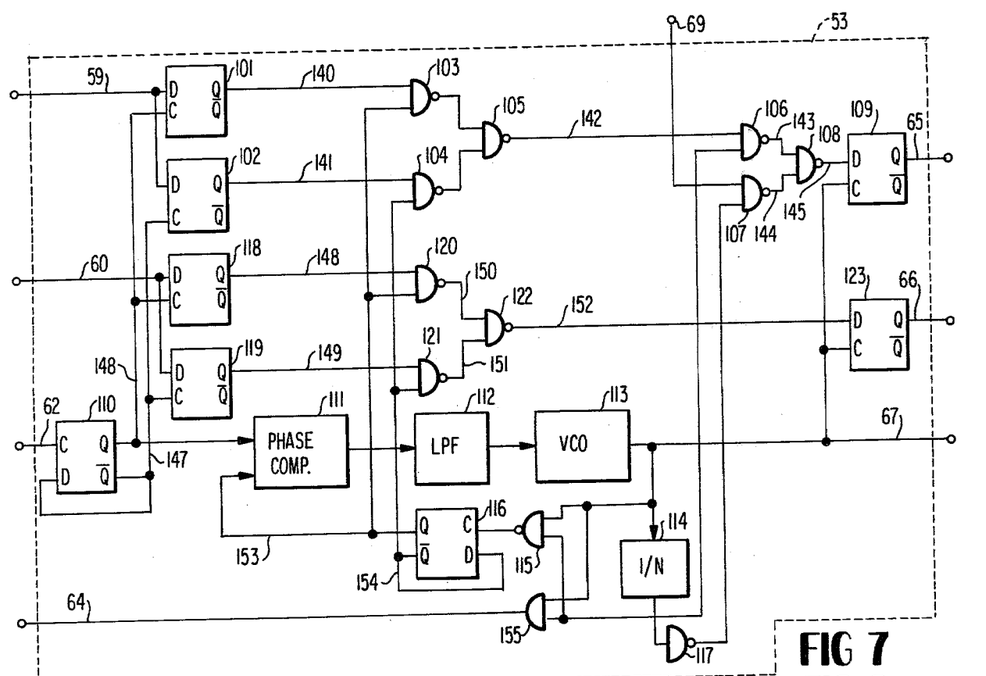
FIG. 7 shows one example of a detailed circuit arrangement for the multiplex section included in FIG. 4(a)

Though the construction and operation of the multiplexer circuit 53 are generally known, they will be described briefly in connection with its preferred embodiment illustrated in FIG. 7.

The clock signal on line 62 having the same frequency as the two series of data signals on lines 59 and 60 has its frequency divided in half by a flip-flop 110. The data signals on lines 59 and 60 are alternately written in flip-flops 101, 102 and 118, 119 as controlled by the frequency-divided, opposite phase clock signals on lines 146 and 147. A voltage controlled oscillator 113 is operable at a frequency matched to the data speed after multiplex of the parity bit, and this voltage controlled oscillator forms a phase-locked loop together with a counter 114, a NAND gate 115, a ½ frequency divider 116, a phase comparator 111 and a low-pass filter 112. By means of this phase-locked loop, a clock signal on line 67 having a frequency that is N/N-1 times as high as the frequency of the clock signal on line 62 can be obtained. By means of the NAND gate 115, the clock signal on line 67 is inhibited for one period in every N periods. The data stored in the flip-flops 101, 102 and 118, 119 are read out as controlled by the opposite phase clock signals on lines 153 and 154 obtained by dividing the frequency of the output signal from NAND gate 115 in half by the ½ frequency divider 116. Vacant time slots are provided in a read-out signal on line 142 at a rate of one bit per N periods by means of NAND gates 106, 107 and 108, and in these vacant time slots, the parity information on line 69 is multiplexed to obtain a signal on line 145. This signal on line 145 as well as a signal on line 152 are reshaped by timed flip-flops 109 and 123 as controlled by the clock signal on line 67, and are outputted as signals on lines 65 and 66. It is to be noted that a frame signal or the like could be inserted into the vacant time slot of one bit in the signal on line 152, similar to the parity information. A control signal on line 64 is outputted from the AND gate 155.

Figure 6:
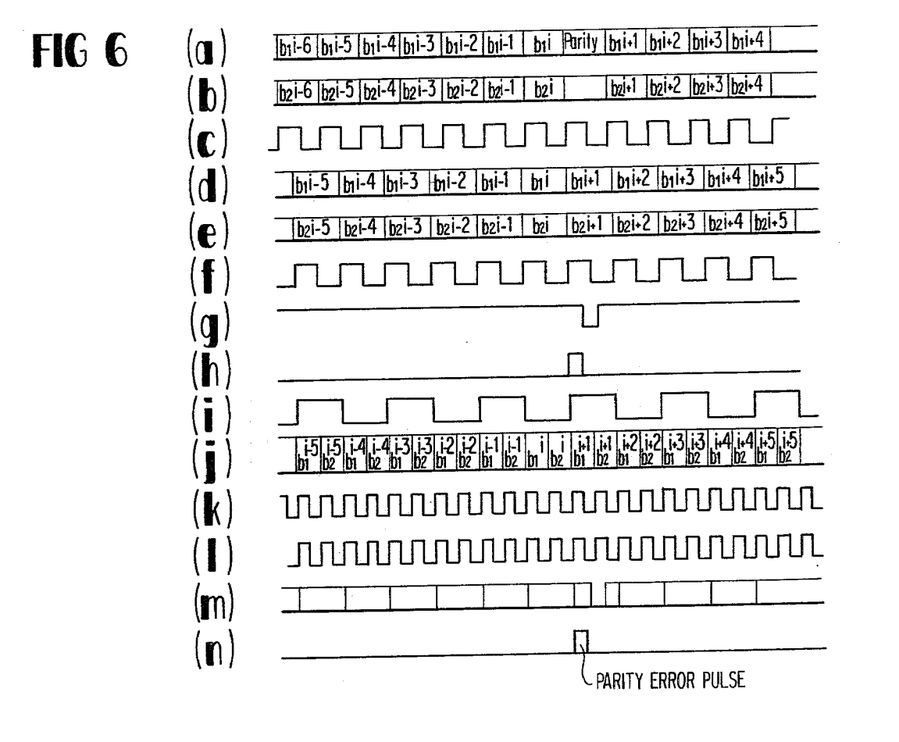

On the other hand, the modulated carrier wave is fed to the demodulator circuit 600. The output code of the circuit 600 is converted to the code $X_R$ according to the formula (4) in the subtraction logic converter 601. The code $X_R$ shown in FIG. 2(g), that is, signals on lines 78 and 79 shown in FIGS. 6(a) and 6(b), are applied to the parity bit demultiplexer circuit 71 jointly with a clock signal on line 80 (shown in FIG. 6(c)) to be demultiplexed into a parity signal on line 85 and two series PCM signals on lines 81 and 82, as shown in FIGS. 6(d) and 6(e) (corresponding to FIG. 2(h)). The demultiplexed signals on lines 81 and 82 are applied to the parallel-series converter circuit 72 jointly, with a clock signal on line 83 (shown in FIG. 6(f)) having a frequency corresponding to the code rate after demultiplexing, to be converted into a series PCM signal on line 87 as shown in FIG. 6(j) (corresponding to FIG. 2(i)), and then outputted. The clock signal on line 83 is also doubled in frequency by a frequency doubler circuit 75 to be outputted as a clock signal on line 89 (shown in FIG. 6(k)). The signal on line 87 which has been converted into a series PCM signal is branched and gated through an AND gate 74 by a clock signal on line 86 (shown in FIG. 6(i)), that is, obtained by dividing the frequency of the clock signal on line 83 by means of a ½ frequency divider 73 and then by means of a parity-counting, D-type flip-flop 76 the parity of the designated bits in the designated section of the PCM signal can be counted. Thereafter, this count information on line 91 (shown in FIG. 6(m)) and the parity information on line 85 (shown in FIG. 6(h)) counted on the transmitter side, which has been demultiplexed by the parity bit demultiplexer circuit 71, are compared in a comparator circuit 77, and if coincidence is not found therebetween, an output signal on line 92 (shown in FIG. 6(n)) is outputted indicating that a code error exists in the parity monitoring section in question.

In addition, a frame or control signal on line 84 (shown in FIG. 6(g)) for designating a monitoring section is generated in the parity bit demultiplexer circuit 71 on the receiver side so that the bits in the same time slots as the bits counted on the transmitter side may be counted. The ½ frequency divider 73 and the parity-counting, D-type flip-flop 76 are controlled by this control signal on line 84. It is a matter of course that the bits to be counted in parity in the PCM signal on line 87 must necessarily be designated by the AND gate 74.

Figure 8:
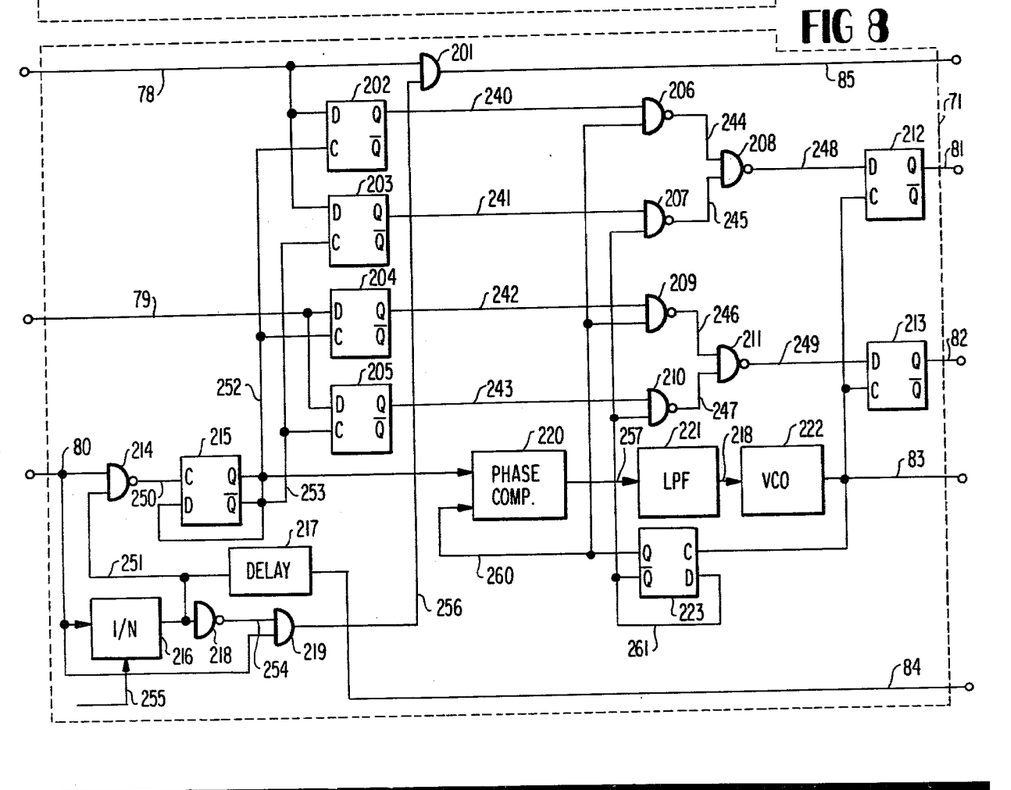
FIG. 8 shows one example of a detailed circuit arrangement for the demultiplex section included in FIG. 4(b)

Though the construction and operation of the demultiplexer circuit 71 are generally known, they will be described briefly in connection with its preferred embodiment illustrated in FIG. 8.

A clock signal on line 250 in which input clock pulses on line 80 are inhibited for one period in every N periods by NAND gate 214 is generated at an output of a 1/N frequency divider 216 which is synchronized by pulses on line 255 that indicate the time slots for the parity bit. This clock signal on line 250 has its frequency divided in half by a frequency divider 215 to generate opposite phase clock signals on lines 252 and 253. A pulse train on line 78 in which the parity bit is multiplexed and another pulse train on line 79 having the same bit rate as the pulse train on line 78 are alternately written in flip-flops 202, 203 and 204, 205 as controlled by the clock signals on lines 252 and 253. In a phase synchronizing circuit composed of a phase comparator 220, a low-pass filter 221, a voltage controlled oscillator 222 and a ½ frequency divider or flip-flop 223, a clock signal on line 83 having a frequency that is (N−1)/N times as small as the frequency of the input clock signal on line 80 is generated. The clock signal on line 83 has its frequency divided in half by flip-flop 223 to generate opposite phase clock signals on lines 260–261. Among the data signals on lines 78 and 79 written in the flip-flops 202, 203 and 204, 205, the data except for the parity bit in the data signal on line 78 and the signal on line 79 in the same time slot, are read out via NAND gates 206, 207 and 209, 210, respectively, as controlled by the clock signals on lines 260–261. Furthermore, this data is converted into two data trains via NAND gates 208 and 211, respectively, and then reshaped with the timed clock signal on line 83 by means of flip-flops 212 and 213, respectively, to obtain data signals on lines 81–82. The parity pulse on line 69 multiplexed on the transmitter side appears as a parity pulse on line 85 which has been demultiplexed from the pulse train on line 78 through AND gate 201. AND gate 201 is opened by a pulse on line 256 which is passed through an AND gate 219, to whose inputs are applied the clock pulse on line 80 and a pulse on line 254 produced by inverting the output pulse on line 251 from the ½ frequency divider 216 that is synchronized with the frame synchronizing pulses on line 255. A frame signal on line 84 is produced by delaying the signal on line 251 through a delay circuit 217.

In addition logic converter 500 and the subtraction logic converter 601 may be made, for example, of the ones disclosed in FIG. 4(a) and 4(b) of the literature (3), respectively. Further, the 4-phase phase modulator circuit 501 and 4-phase phase demodulator circuit 600 may be made, for example, of the ones disclosed in FIGS. 2.2 and 2.3 of the following literature (4), respectively:

(4) S. Yokoyama et al., "The Performance and the Features of the 4-level PSK MODEM for an Ultralarge TDMA System," *NEC Research & Development*, No. 36, January 1975, pages 21–31.

In FIGS. 4(a) and 4(b), when the monitoring is not needed for a single code error in the transmission path including the series-parallel converter 52 and the parallel-series converter 75, the single code error is checked by counting the two series of PCM signals 59, 60 and 81, 82 in alternate code time slots. Further, the two series of PCM signals 59, 60 and 81, 82 can be directly fed to and from the monitoring system, respectively, thereby dispensing with the series-parallel converter 52 and the parallel-series converter 72. In such a case, the two series of PCM signals are fed to an exclusive-OR gate. The output code of the exclusive-OR gate is counted in alternate code time slots to provide a parity signal. This detailed system will now be described referring to FIGS. 9(a) and 9(b).

Figure 9A:
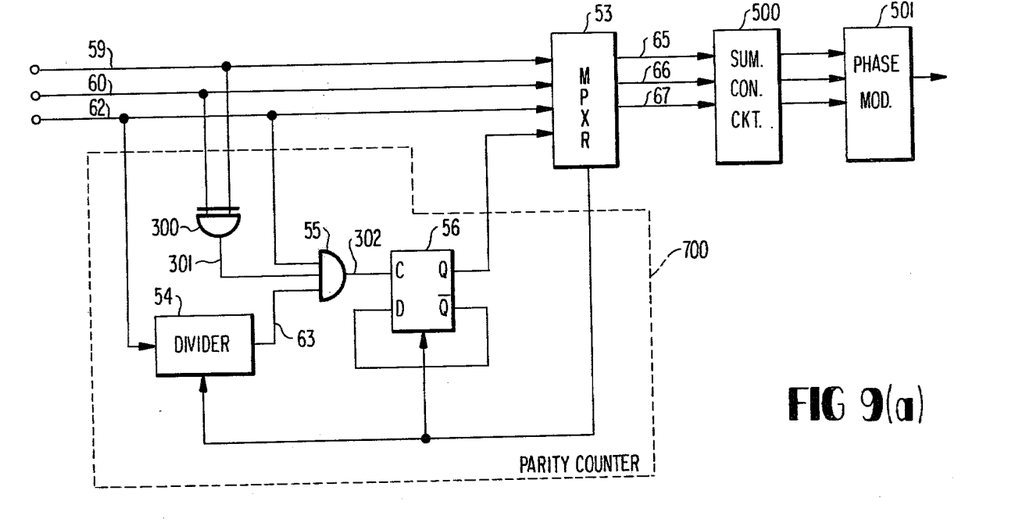
FIGS. 9(a) and 9(b) show a block diagram illustrating another preferred embodiment of the invention, a transmitter section being shown at (a), and a receiver section being shown at (b).

In FIG. 9(a), the transmitter section comprises the circuits 53, 500 and 501 shown in FIG. 4(a) and parity counter 700. The parity counter 700 further comprises the circuits 54, 55 and 56 shown in FIG. 4(a) and an exclusive-OR gate 300. The signals 59 and 60 (shown in FIGS. 5(c) and 5(d)) are fed to the input terminals of the exclusive-OR gate 300. The output signal 301 of the exclusive-OR gate 300 is controlled in the AND gate 55 by the signals 62 and 63 (shown in FIGS. 5(e) and 5(f)). The number of marks and spaces of the AND gate output signal 301 are counted in the flip-flop 56 to provide a parity signal to the multiplexer circuit 53. The other circuits operate similarly to the corresponding circuits in FIG. 4(a).

Figure 9B:
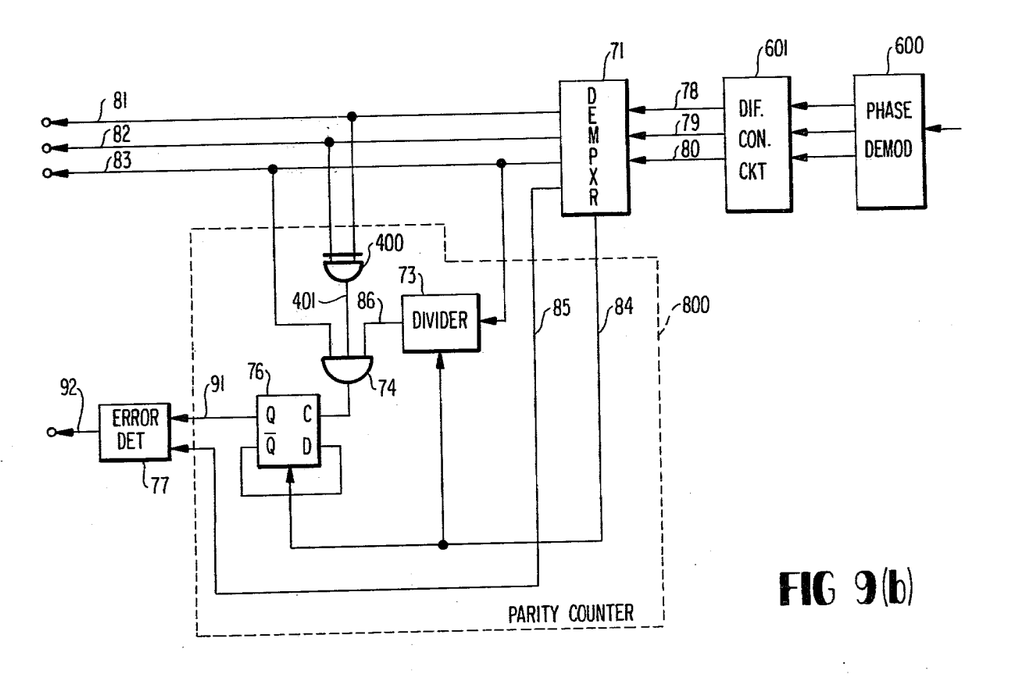

On the other hand, the receiver section shown in FIG. 9(b) comprises the circuits 71, 77, 600 and 601 shown in FIG. 4(b) and a parity counter 800. The parity counter 800 further comprises the circuits 73, 74, and 76 shown in FIG. 4(b) and an exclusive-OR gate 400. In FIG. 9(b), the signals 81 and 82 (shown in FIGS. 6(a) and 6(e)) are fed to the input terminals of the exclusive-OR gate 400. The output signal 401 of the exclusive-OR gate 400 are controlled in the AND gate 74 by the signals 83 and 86 (shown in FIGS. 6(i) and 6(f)).

As described above, according to the present invention, it is only necessary to count a parity consisting of one bit so that the circuit construction becomes far simpler than the prior art system in which a plurality of parity bits had to be used.

In addition, although the present invention has been described above in connection with a 4-phase differential phase modulation system, the invention should not be limited to only such a modulation system. Instead, in the case of an N-phase differential phase modulation system (N being equal to $2^n$; n being a positive integer) in which encoding is made so that codes corresponding to adjacent phases have a Hamming distance of 1 therebetween, if the PCM signals forming the codes are monitored at alternate code time slots on a bit-by-bit basis according to the parity check system, then a single code error to an adjacent phase in one parity monitoring section on the transmission path can be reliably detected with one parity bit so long as it occurs only once in one monitoring section, similar to the above-described case.

In the illustrated embodiment, the present invention has been described with respect to the case where difference conversion is effected between adjacent code time slots. However, this difference conversion need not always be effected between adjacent codes. If the difference conversion is effected between time slots separated by j(<k) time slots from each other, then the conversion represented by formulae (1) and (4) are modified as represented by the following formulae (9) and (10):

$$Y_T^i = X_T^i + Y_T^{i-j} \text{ and} \quad (9)$$

$$Y_R^i = Y_R^i - Y_R^{i-j}, \quad (10)$$

so that formulae (7) and (8) are respectively modified to the following formulae (11) and (12):

$$\begin{aligned} d(X_R^i) &= d(Y_R^i) - d(Y_R^{i-j}) \\ &= d(Y_T^i) \pm 1 - d(Y_T^{i-j}) \\ &= d(X_T^i) \pm 1 \text{ and} \end{aligned} \quad (11)$$

$$\begin{aligned} d(X_R^{i+j}) &= d(Y_R^{i+j}) - d(Y_R^i) \\ &= d(Y_T^{i+j}) - d(Y_T^i) \mp 1 \\ &= d(X_T^{i+j}) \mp 1. \end{aligned} \quad (12)$$

Therefore, in the process of monitoring over one parity monitoring section, consecutive j codes are monitored on a bit-by-bit basis, and then the subsequent consecutive j codes are not monitored. If monitoring is effected by repeating the aforementioned process, then similar to the illustrated embodiment, a single code error occurring in one monitoring section can be monitored with one parity bit so long as it occurs only once in one monitoring section.

As fully described above, in the case of the line monitoring system according to the present invention, even in a transmission system employing differential phase modulation, a single code error in the transmission path can be monitored by providing one parity bit within one parity monitoring section, and, therefore, in comparison to the heretofore known monitoring systems in which one parity monitoring section is monitored by means of two or more parity bits, the channel monitoring system according to the present invention is more advantageous in that the constructions of the parity counter circuit, parity multiplexer circuit and parity demultiplexer circuit become far simpler, and at the same time the information transmission efficiency can be enhanced.

In addition, in the case of a radio transmission path, besides the parity bit for monitoring a channel, it becomes necessary to time division multiplex a particular pattern to a transmission pulse train and to time division multiplex a frame signal or the like for achieving bit synchronization of the pattern, in order to add a channel discrimination capability that is necessitated for cross-polarized wave multiplex or transmission through near spaces. Upon designing the frame structure of these pulse trains in such a case, the design conditions are mitigated since only one parity bit is required to be added for monitoring the transmission quality.

What is claimed is:

1. In a carrier wave differential phase modulation PCM transmission system comprising a transmitter and a receiver of the type wherein said transmitter includes first conversion means for effecting conversion between an input sequence of PCM data and n series of PCM data forming binary codes (n being a positive integer greater than 1), second conversion means for converting said n series of PCM data forming binary codes into n series of differential binary codes across an arbitrary equal time slot interval, and an N-phase modulator (N being equal to $2^n$) for phase modulating a carrier wave with said n series of differential binary codes, and wherein said receiver includes an N-phase demodulator for demodulating a received N-phase phase modulated carrier wave to produce n series of differential binary codes, third conversion means for converting said n series of differential binary codes into n series of PCM data forming binary codes, and fourth conversion means for effecting conversion between said n series of PCM data and a sequence of PCM data, the improvement comprising a channel monitoring system for detecting a bit error in a transmission channel between said transmitter and said receiver by the use of only one parity bit for one monitoring section of said PCM data, said channel monitoring system comprising in said transmitter:

first parity counting means for repetitively parity-counting said binary codes of a monitoring section so that said binary codes are continuously parity-counted for the number of codes corresponding to said time slot interval while the subsequent binary codes are not parity-counted for the same number of codes corresponding to said time slot interval, and for generating said one parity bit corresponding to the parity-counted codes; and multiplexer means interposed between said first and second conversion means for time-division multiplexing said one parity bit with said n series of PCM data forming said binary codes, said channel monitoring system further comprising in said receiver;

demultiplexer means interposed between said third and fourth conversion means for time-division demultiplexing a parity bit from a monitoring section of said n series of PCM data forming binary codes;

second parity counting means for parity-counting the binary codes corresponding to the binary codes parity-counted at said transmitter, and for generating a parity bit corresponding to the parity-counted codes; and comparator means for comparing the parity bit from said demultiplexer with the parity bit generated by said second parity counter for each of said monitoring sections to thereby detect a bit error.

2. The channel monitoring system as recited in claim 1 wherein n=2 and N=4, said first parity counter means comprises:
a first source of clock signal for said PCM data;
first frequency dividing means for dividing said PCM data clock signal by 4;
first AND gate means receiving as inputs said input sequence of PCM data, said PCM data clock signal and the output of said frequency dividing means; and
a first parity-counting flip-flop connected to count the output of said first AND gate and generate said one parity bit,
said second parity counter means comprises:
a second source of clock signal derived from said differential binary code for said n series of binary codes;
second frequency dividing means for dividing said binary code clock signal by 2;
frequency doubler means for doubling the frequency of said binary code clock signal;
second AND gate means receiving as inputs said sequence of PCM data from said fourth conversion means, the output of said second frequency dividing means, and the output of said frequency doubler means; and
a second parity-counting flip-flop connected to count the output of said second AND gate and generate said parity bit corresponding to the parity-counted codes.

3. The channel monitoring system as recited in claim 2 wherein said multiplexer includes a first frame signal generating means responsive to said PCM data clock signal for generating a first frame pulse for each said time slot interval, said first frame pulse controlling said first frequency dividing means and said first parity-counting flip-flop and wherein said demultiplexer includes a second frame signal generating means responsive to a clock signal derived from said differential binary code for generating a second frame pulse for each said time slot interval, said second frame pulse controlling said second frequency dividing means and said second parity-counting flip-flop.

4. In a channel monitoring system for detecting a bit error in transmission channel between a transmitting section and a receiving section by the use of parity signals added to n series of binary codes (n being a positive integer equal to or greater than 2) divided into a plurality of monitoring sections having a time slot interval equal to each other, said transmitting section including means for converting said n series of binary codes into n series of differential binary codes across an arbitrary equal time slot interval shorter than the interval of the monitoring section, an N-phase modulator (N being equal to $2^n$) for phase-modulating a carrier wave with said n series of differential binary codes, and means for transmitting said modulated carrier wave the improvements characterized by:
(a) said transmitting section further including:
(1) first means for repetitively parity-counting said binary codes of the monitoring section corresponding to each of said parity signals so that said binary codes are continuously parity-counted for the number of codes corresponding to said time slot interval while the subsequent binary codes are not parity-counted for the same number of codes corresponding to said time slot interval; and
(2) means for generating one bit of said parity signal corresponding to the parity-counted codes; and
(b) said receiving section including:
(1) means for deriving said binary codes from said modulated carrier wave;
(2) second means for counting the binary codes corresponding to the binary codes parity-counted at the transmitting section among the output codes of the deriving means; and
(3) means for comparing the counted content of said second counting means with said one bit of parity signal with respect to each of said monitoring sections to thereby detect a bit error.

* * * * *